(12) United States Patent
Watanabe et al.

(10) Patent No.: US 11,256,202 B2
(45) Date of Patent: Feb. 22, 2022

(54) SNAP RING, ROTATOR DEVICE, FIXING DEVICE, AND IMAGE FORMING APPARATUS

(71) Applicants: Yohhei Watanabe, Kanagawa (JP); Naoto Suzuki, Kanagawa (JP); Yuta Azeyanagi, Kanagawa (JP); Nobuo Kuwabara, Kanagawa (JP); Kenji Honjoh, Kanagawa (JP); Teppei Kawata, Kanagawa (JP); Haruki Nagata, Kanagawa (JP); Michiharu Suzuki, Kanagawa (JP)

(72) Inventors: Yohhei Watanabe, Kanagawa (JP); Naoto Suzuki, Kanagawa (JP); Yuta Azeyanagi, Kanagawa (JP); Nobuo Kuwabara, Kanagawa (JP); Kenji Honjoh, Kanagawa (JP); Teppei Kawata, Kanagawa (JP); Haruki Nagata, Kanagawa (JP); Michiharu Suzuki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/123,780

(22) Filed: Dec. 16, 2020

(65) Prior Publication Data

US 2021/0200124 A1 Jul. 1, 2021

(30) Foreign Application Priority Data

Dec. 25, 2019 (JP) .............................. JP2019-234982

(51) Int. Cl.
*G03G 15/00* (2006.01)
*F16B 21/00* (2006.01)
(Continued)

(52) U.S. Cl.
CPC ....... *G03G 15/2053* (2013.01); *F16B 21/186* (2013.01); *F16C 35/063* (2013.01);
(Continued)

(58) Field of Classification Search
CPC ........... G03G 15/2053; G03G 21/1647; G03G 2221/1657; G03G 2221/1651;
(Continued)

(56) References Cited

U.S. PATENT DOCUMENTS 2,036,978 A * 4/1936 Edmundb ............. F16C 35/077
384/564
2,416,852 A * 3/1947 Wurael ................. F16B 21/186
411/518
(Continued)

FOREIGN PATENT DOCUMENTS

JP 09325634 A * 12/1997
JP 2009-068657 4/2009
(Continued)

OTHER PUBLICATIONS

Taiyo Stainless Spring Co., Ltd., an example of a "Snap Retainers", No. 47-25, online accessed Dec. 13. 2019, Japan.

*Primary Examiner* — Robert B Beatty
(74) *Attorney, Agent, or Firm* — Harness, Dickey & Pierce, P.L.C.

(57) ABSTRACT

A snap ring is set to a set portion of a shaft of a rotator from a direction orthogonal to an axial direction of the shaft. The snap ring includes a first arcuate portion and a second arcuate portion facing each other, being elastically deformable in directions away from each other, holding the set portion by elastic deformation restoring force. One ends of the first and second arcuate portions are away from each other to form an insertion portion to insert the set portion. When the snap ring is not used, the first arcuate portion has
(Continued)

a same radius of curvature as the second arcuate portion and the set portion, and a center of curvature closer to the second arcuate portion than the first arcuate portion, and the second arcuate portion has a center of curvature closer to the first arcuate portion than the second arcuate portion.

20 Claims, 7 Drawing Sheets

(51) Int. Cl.
| | | |
|---|---|---|
| *F16C 35/00* | (2006.01) | |
| *G03G 15/20* | (2006.01) | |
| *G03G 21/16* | (2006.01) | |
| *F16B 21/18* | (2006.01) | |
| *F16C 35/063* | (2006.01) | |

(52) U.S. Cl.
CPC ...... *G03G 21/1647* (2013.01); *F16C 2226/74* (2013.01); *F16C 2324/16* (2013.01); *G03G 2215/00413* (2013.01); *G03G 2221/1651* (2013.01)

(58) Field of Classification Search
CPC ...... F16B 21/18; F16B 21/186; F16C 35/063; F16C 35/077; F16C 33/605; F16C 2226/74; F16C 2324/16
USPC .......................................... 399/322; 384/903
See application file for complete search history.

(56) References Cited

U.S. PATENT DOCUMENTS

| | | | | |
|---|---|---|---|---|
| 3,431,809 | A * | 3/1969 | Frailly | F16B 21/186 411/516 |
| 5,785,433 | A * | 7/1998 | Takahashi | F16C 35/067 384/539 |
| 8,843,046 | B2 * | 9/2014 | Nawa | G03G 15/2053 399/330 |
| 8,918,044 | B2 * | 12/2014 | Takematsu | G03G 15/0189 399/330 |
| 2005/0214101 | A1 * | 9/2005 | Dexter | F16B 21/18 411/518 |
| 2012/0201486 | A1 * | 8/2012 | Ito | F16C 33/80 384/448 |
| 2015/0224821 | A1 * | 8/2015 | Nollenberger | F16C 35/067 384/539 |
| 2017/0357198 | A1 | 12/2017 | Namekata et al. | |
| 2018/0088502 | A1 | 3/2018 | Sugiyama et al. | |
| 2019/0011864 | A1 | 1/2019 | Kawata et al. | |
| 2019/0018348 | A1 | 1/2019 | Watanabe et al. | |
| 2019/0018351 | A1 | 1/2019 | Hirose et al. | |
| 2019/0243291 | A1 | 8/2019 | Matsuda et al. | |
| 2020/0217369 | A1 * | 7/2020 | Hiura | F16C 35/073 |

FOREIGN PATENT DOCUMENTS

| | | | |
|---|---|---|---|
| JP | 2009068657 A | * | 4/2009 |
| JP | 2015052687 A | * | 3/2015 |

* cited by examiner

Related Art

SNAP RING, ROTATOR DEVICE, FIXING DEVICE, AND IMAGE FORMING APPARATUS

CROSS-REFERENCE TO RELATED APPLICATION

This patent application is based on and claims priority pursuant to 35 U.S.C. § 119 to Japanese Patent Application No. 2019-234982, filed on Dec. 25, 2019 in the Japan Patent Office, the entire disclosure of which is hereby incorporated by reference herein.

BACKGROUND

Technical Field

Embodiments of the present disclosure generally relate to a snap ring, a rotator device, a fixing device and an image forming apparatus.

Background Art

A snap ring includes a first arcuate portion and a second arcuate portion that face each other and are elastically deformable. A part of the snap ring is removed in a circumferential direction of the snap ring to form an insertion portion into which a set portion of a shaft of a rotator is inserted in a direction orthogonal to an axial direction of the shaft. Inserting the set portion into the insertion portion elastically deforms the first arcuate portion and the second arcuate portion and opens the insertion portion. The inserted set portion is sandwiched by the first arcuate portion and the second arcuate portion. Elastic deformation restoring forces of the first arcuate portion and the second arcuate portion holds the shaft.

SUMMARY

This specification describes an improved snap ring that is configured to be set to a set portion of a shaft of a rotator from a direction orthogonal to an axial direction of the shaft. The snap ring includes a snap ring body that includes a first arcuate portion and a second arcuate portion. The first arcuate portion and the second arcuate portion face each other, is elastically deformable in directions away from each other, and is configured to hold the set portion by elastic deformation restoring force. One end of the first arcuate portion and one end of the second arcuate portion are away from each other to form an insertion portion to insert the set portion. When the snap ring is not used, the first arcuate portion has a same radius of curvature as the second arcuate portion, a same radius of curvature as the set portion, and a center of curvature closer to the second arcuate portion than the first arcuate portion, and the second arcuate portion has a center of curvature closer to the first arcuate portion than the second arcuate portion.

BRIEF DESCRIPTION OF THE DRAWINGS

The aforementioned and other aspects, features, and advantages of the present disclosure would be better understood by reference to the following detailed description when considered in connection with the accompanying drawings, wherein.

Figure 1:
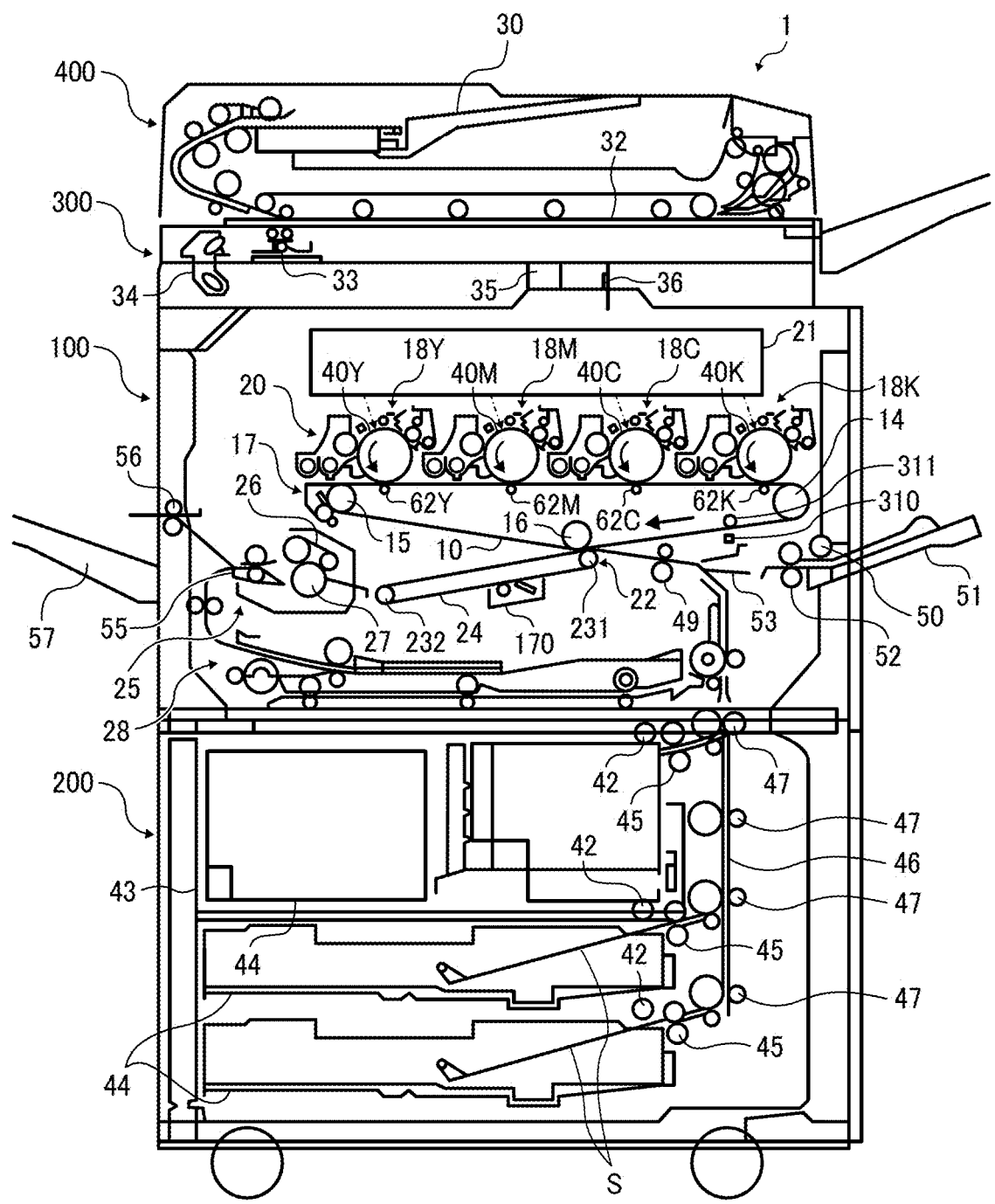
FIG. 1 is a schematic view illustrating a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Although the embodiments are described with technical limitations with reference to the attached drawings, such description is not intended to limit the scope of the disclosure, and all of the components or elements described in the embodiments of this disclosure are not necessarily indispensable.

Hereinafter, embodiments of the present disclosure are described with reference to the drawings.

FIG. 1 is a schematic view illustrating a configuration of an image forming apparatus according to an embodiment of the present disclosure.

Referring to FIG. 1, an image forming apparatus 1 according to the present embodiment includes an apparatus body 100 that is a printer unit, a sheet feed table 200 serving as a recording medium supply unit on which the apparatus body is placed, and a scanner 300 as an image reading device mounted on the apparatus body 100. In addition, the image forming apparatus 1 according to the present embodiment includes an automatic document feeder (ADF) 400 mounted on the scanner 300.

The apparatus body 100 includes an intermediate transfer belt 10 that serves as an intermediate transferor, which is composed of an endless belt that serves as an image bearer, and the intermediate transfer belt 10 is disposed in the center of the apparatus body 100. The intermediate transfer belt 10 is stretched over a first support roller 14, a second support roller 15 and a third support roller 16 serving as three support rotators and rotates clockwise in FIG. 1. On the left of the second support roller 15 of the three support rollers in FIG. 1, an intermediate transfer belt cleaner 17 is disposed. The intermediate transfer belt cleaner 17 removes residual toner on the intermediate transfer belt 10 after image transfer. In addition, a tandem image forming section 20 as a toner image forming device is disposed opposite a surface portion of the intermediate transfer belt 10 stretched taut across the first support roller 14 and second support roller 15 of the three support rollers.

The tandem image forming section 20 includes four image forming units 18Y, 18M, 18C, and 18K corresponding to colors of yellow (Y), magenta (M), cyan (C), and black (K) respectively and being disposed along a rotation direction of the intermediate transfer belt 10 as illustrated in FIG. 1. In the present embodiment, the third support roller 16 is a drive roller. Above the tandem image forming section 20, an exposure device 21 is provided.

A secondary transfer device 22 is disposed opposite the tandem image forming section 20 via the intermediate transfer belt 10. In the secondary transfer device 22, a secondary transfer belt 24 is stretched across two rollers 231 and 232. The secondary transfer belt 24 is an endless belt and serves as a sheet conveyer. The secondary transfer belt 24 is disposed to press against the third support roller 16 via the intermediate transfer belt 10. The secondary transfer device 22 transfers a toner image formed on the intermediate transfer belt 10 to a sheet S that is a recording medium. Additionally, a secondary transfer belt cleaning device 170 may be provided to clean the outer circumferential surface of the secondary transfer belt 24 as illustrated in FIG. 1.

On the left side of the secondary transfer device 22 in FIG. 1, a fixing device 25 is disposed to fix the toner image on the sheet S. The fixing device 25 includes a fixing belt 26 as an endless belt to be heated and a pressure roller 27 pressed against the fixing belt 26.

The secondary transfer device 22 has a sheet conveyance function to convey the sheet S to the fixing device 25 after the toner image is transferred from the intermediate transfer belt 10 onto the sheet S. Below the secondary transfer device 22 and the fixing device 25, a sheet reverse unit 28 is disposed in parallel to the tandem image forming section 20 and reverses the sheet S to print both sides of the sheet S.

When a user makes a copy using the above-described image forming apparatus 1, the user places a document on a document table 30 of the automatic document feeder 400. Alternatively, the user may open the automatic document feeder 400, place the document on an exposure glass 32 of the scanner 300, and close the automatic document feeder 400 to press the document against the exposure glass 32. When the user sets the document on the automatic document feeder 400 and presses a start switch on a control panel, the automatic document feeder 400 conveys the document to the exposure glass 32.

When the user sets the document on the exposure glass 32 and presses the start switch, the scanner 300 is driven immediately to move a first carriage 33 and a second carriage 34. Subsequently, the first carriage 33 directs an optical beam from a light source onto the document, and then the optical beam is reflected from a surface of the document to the second carriage 34. Further, the optical beam reflected from a mirror of the second carriage 34 passes through an imaging forming lens 35 and then enters an image reading sensor 36. Thus, the image reading sensor 36 reads the image on the document to obtain the image data.

In parallel with the reading of the document, a drive motor as a driver rotates the third support roller 16 as the drive roller. The rotations of the third support roller 16 rotate the intermediate transfer belt 10 clockwise in FIG. 1, and the rotations of the intermediate transfer belt 10 rotate the other two support rollers that are driven rollers, that is, the first support roller 14 and the second support roller 15.

The image forming units 18Y, 18M, 18C, and 18K include drum-shaped photoconductors 40Y, 40M, 40C, and 40K serving as image bearers, respectively. In parallel with the reading of the document and the rotations of the intermediate transfer belt 10 described above, the drum-shaped photoconductors 40Y, 40M, 40C, and 40K rotate. A surface of each of photoconductors 40Y, 40M, 40C, and 40K is exposed according to the image data of respective colors of yellow, magenta, cyan, and black to form electrostatic latent images. The electrostatic latent images are developed into yellow, magenta, cyan, and black toner images as visible toner images respectively.

Primary transfer devices 62Y, 62M, 62C, and 62K include primary transfer rollers as primary transferors and are disposed opposite the photoconductors 40Y, 40M, 40C, and 40K via a belt part of the intermediate transfer belt 10 between the first support roller 14 and the second support roller 15. The primary transfer devices 62Y, 62M, 62C, and 62K sequentially transfer the toner images on the photoconductors 40Y, 40M, 40C, and 40K onto the intermediate transfer belt 10 to overlap each other and synthesize the toner images to form a synthesized color toner image on the intermediate transfer belt 10.

In parallel to the above image formation, one of feed rollers 42 in the sheet feed table 200 is selected and rotated to move the sheets S from one of multistage sheet trays 44 provided in a sheet bank 43. The moved sheets S are separated one by one by a separation roller pair 45. The separated sheet S is inserted into a sheet conveyance path 46, conveyed by conveyance rollers 47 to a sheet conveyance path inside the apparatus body 100, and stopped by a registration roller pair 49 when the sheet S contacts the registration roller pair 49. Alternatively, a bypass feed roller 50 rotates to move sheets placed on a bypass feeder 51. The moved sheets are separated by a bypass separation roller 52 one by one. The separated sheet is conveyed to a bypass sheet conveyance path 53 and stopped by the registration roller pair 49 when the sheet contacts the registration roller pair 49.

Timed to coincide with the synthesized color toner image on the intermediate transfer belt 10, the registration roller pair 49 rotates and sends the sheet S to a secondary transfer nip between the intermediate transfer belt 10 and the secondary transfer device 22. The secondary transfer device 22 transfers the color toner image onto the sheet S.

The secondary transfer belt 24 conveys the sheet S bearing the color toner image to the fixing device 25. In the fixing device 25, the fixing belt 26 and the pressure roller 27 apply heat and pressure to the sheet S to fix the color toner image on the sheet S. After the above fixing process, a switching craw 55 directs the sheet S to an ejection roller pair 56. The ejection roller pair 56 ejects the sheet S onto a sheet ejection tray 57 that stacks the sheet S. Alternatively, the switching craw 55 directs the sheet S to the sheet reverse unit 28. The sheet reverse unit 28 reverses the sheet S and guides the sheet S to the secondary transfer nip where another toner image is transferred onto a back side of the sheet S. Thereafter, the ejection roller pair 56 ejects the sheet S onto the sheet ejection tray 57.

The intermediate transfer belt cleaner 17 removes residual toner that remains on the intermediate transfer belt 10 after the secondary transfer of the color toner image from the intermediate transfer belt 10, and the tandem image forming section 20 becomes ready for a next image formation. In general, the registration roller pair 49 is grounded, however, the registration roller pair 49 may be applied with a bias voltage to remove paper dust from the sheet S.

The apparatus body 100 includes a toner adhesion amount sensor 310 that is an optical sensor unit serving as an image density detector to detect a density of the toner image formed on the outer circumferential surface of the intermediate transfer belt 10. The toner adhesion amount sensor 310 works as the image density detector that detects the density of the toner image on the intermediate transfer belt 10 to detect an image density fluctuation by detecting a toner adhesion amount on the intermediate transfer belt 10. The toner adhesion amount sensor 310 is also called a toner image detection sensor or a toner adhesion detection sensor. The toner adhesion amount sensor 310 detects a density of toner image in a test pattern formed on the surface of the intermediate transfer belt 10 to obtain a detection result used in correction control of the image density fluctuation. In addition, as illustrated in FIG. 1, a facing roller 311 may be disposed at a position opposite the toner adhesion amount sensor 310 via the intermediate transfer belt 10.

Figure 2:
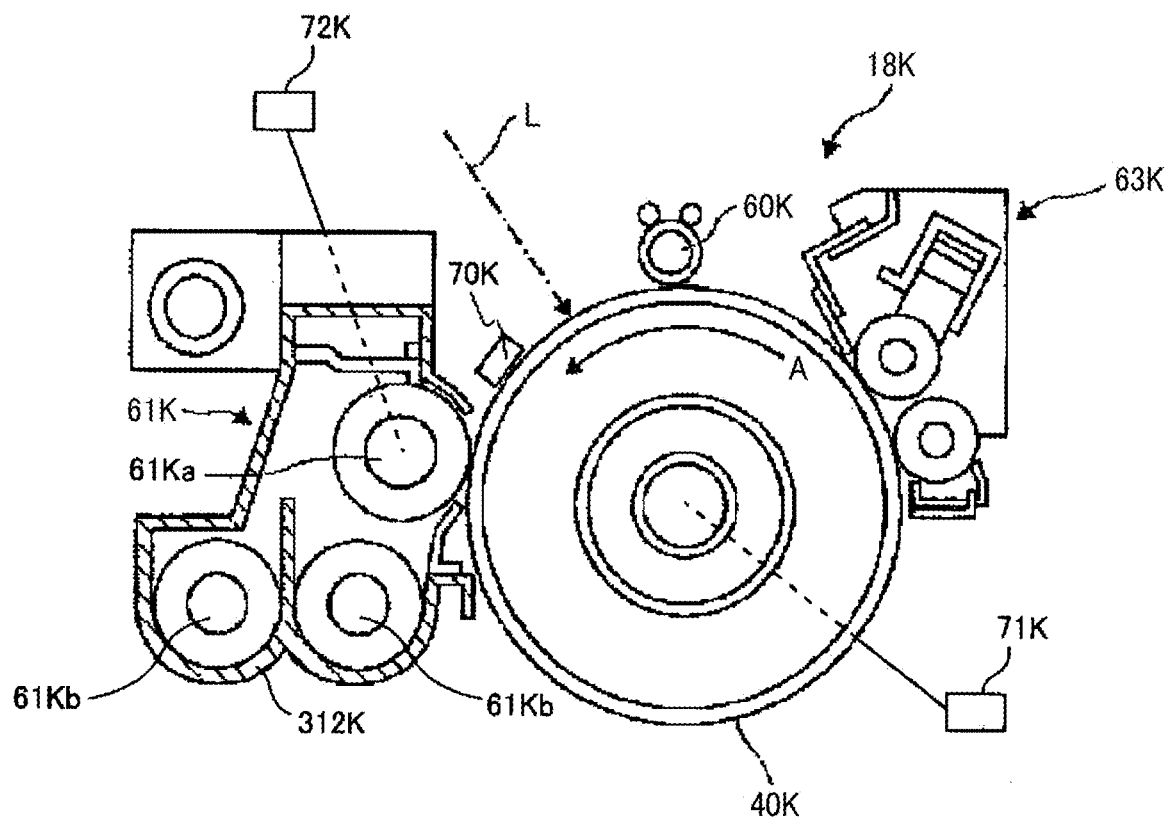
FIG. 2 is a schematic view illustrating a configuration of an image forming unit in a tandem image forming section of the image forming apparatus of FIG. 1.

FIG. 2 is a schematic view illustrating a configuration of the image forming unit 18K in the tandem image forming section 20 of the image forming apparatus 1 of FIG. 1.

The image forming unit 18K to form the black toner image is described below. The image forming units 18Y, 18M, and 18C have an identical configuration.

As illustrated in FIG. 2, the image forming unit 18K includes, for example, a charging device 60K, a potential sensor 70K, a developing device 61K, a photoconductor cleaner 63K, and a discharger around the drum-shaped photoconductor 40K.

The photoconductor 40K is driven by a drive motor as an image bearer driver to rotate in a rotation direction A during image formation. The surface of the photoconductor 40K is uniformly charged by the charging device 60K and is exposed by exposure light L from the exposure device 21 controlled based on color image signals generated according to the image data created by the scanner 300 that reads the image on the document. Thus, an electrostatic latent image is formed on the surface of the photoconductor 40K. The color image signals generated according to the image data by the scanner 300 are subjected to imaging processes such as a color conversion process by an image processor and output to the exposure device 21 as image signals for each color of yellow, magenta, cyan, and black. The exposure device 21 converts black image signals from the image processor into optical signals, irradiates and scans the uniformly charged surface of the photoconductor 40K with the exposure light L based on the optical signals to form an electrostatic latent image on the photoconductor 40K.

The developing device 61K includes a developing roller 61Ka as a developer bearer. A developing bias voltage is applied to the developing roller 61Ka to form a developing potential that is a potential difference between the electrostatic latent image on the photoconductor 40K and the developing roller 61Ka. The developing potential transfers the toner on the developing roller 61Ka from the developing roller 61Ka to the electrostatic latent image on the photoconductor 40, and the electrostatic latent image is developed to form the toner image. In addition, the developing device 61K includes a developer conveying screw 61Kb in a developer conveying portion of the developing device 61K and a toner concentration sensor 312K in a bottom portion of the developer conveying portion to detect a concentration (e.g., percent by weight) of toner in the developer.

The black toner image formed on the photoconductor 40K is transferred onto the intermediate transfer belt 10 by the primary transfer device 62K. After the black toner image is transferred, the photoconductor cleaner 63K removes the residual toner from the surface of the photoconductor 40K, and the discharger discharge the surface of the photoconductor 40K. Thus, the photoconductor 40K is ready for the next image formation. Similarly, the image forming units 18Y, 18M, and 18C include charging devices, potential sensors, developing devices, photoconductor cleaners, and dischargers around the drum-shaped photoconductors 40Y, 40M, and 40C, respectively. The image forming units 18Y, 18M, and 18C form yellow, magenta, and cyan toner images on the photoconductors 40Y, 40M, and 40C, respectively. The toner images are primarily transferred onto the intermediate transfer belt 10 such that the yellow, magenta, and cyan toner images are superimposed on the intermediate transfer belt 10.

The exposure device 21 and the charging devices 60Y, 60M, 60C, and 60K in the image forming apparatus 1 described above work as electrostatic latent image writers that form electrostatic latent images on the surfaces of the photoconductors 40Y, 40M, 40C, and 40K. In addition, the exposure device 21, the charging devices 60Y, 60M, 60C, and 60K, and the developing devices 61Y, 61M, 61C, and 61K work as toner image forming devices that form toner images on the surfaces of the photoconductors 40Y, 40M, 40C, and 40K.

The image forming apparatus 1 according to the present embodiment includes photointerrupters 71K and 72K. The photointerrupter 71K is a rotational position detector that detects a rotational position of the photoconductor 40K. The photointerrupter 72K is a rotational position detector that detects a rotational position of the developing roller 61Ka. The photointerrupters 71K and 72K optically detect the rotational position of the photoconductor 40K serving as a rotator and the developing roller 61Ka serving as another rotator, respectively. For example, each of the photointerrupters 71K and 72K includes a light-emitting element and a light-receiving element facing each other. A filler for detecting rotational position is disposed on a rotating part of the rotator. When the filler passes through a space between the light-emitting element and the light-receiving element, light from the light-emitting element is cut out by the filler. Thus, a rotational position of the rotator is identified. The filler to detect the rotational position rotates together with the photoconductor 40K. The filler includes a notch around a circumference of the filler. Therefore, light passes through the notch and reaches the light-receiving element in every turn of the photoconductor 40K. Thus, the rotational position of the photoconductor 40K is identified. The rotational position detector that detects a rotational position of the rotator such as the photoconductor 40K and the developing roller 61Ka may use devices other than the photointerrupter.

Figure 3:
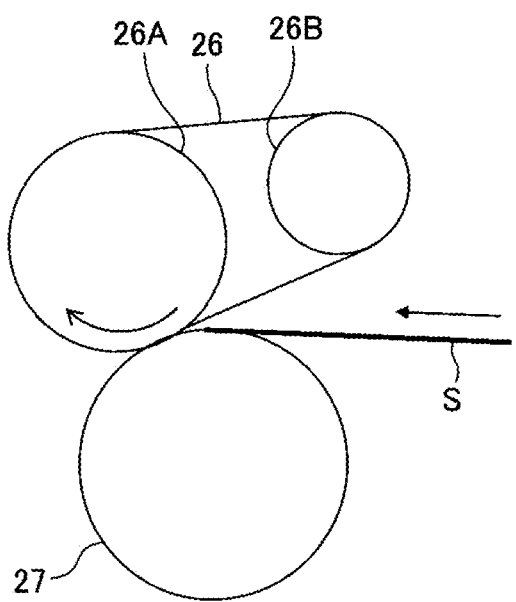
FIG. 3 is a schematic view illustrating a configuration of a fixing device in the image forming apparatus of FIG. 1.

FIG. 3 is a schematic view illustrating a configuration of the fixing device 25 in the image forming apparatus 1.

The fixing device 25 according to the present embodiment includes the fixing belt 26 extended between a fixing roller 26A that is a drive rotator and a heating roller 26B that is a driven rotator and the pressure roller 27 pressed against the fixing belt 26. The fixing belt 26 is entrained around the fixing roller 26A and the heating roller 26B with a certain tension given by a heating roller tension spring secured to a fixing frame. The pressure roller 27 is pressed against the fixing roller 26A across the fixing belt 26 to form a fixing nip. The fixing device 25 may include a fixing separator and a pressure separator disposed downstream from the fixing nip in a conveyance direction of the sheet S.

A belt having a two-layer structure in cross section may be suitably used for the fixing belt 26. Specifically, the fixing belt 26 is constructed of a base layer made of, e.g., polyimide and an elastic layer made of, e.g., silicone rubber. The fixing roller 26A may include, for example, a cored bar made of metal and silicone rubber coating the cored bar. To shorten warm-up time, silicone rubber foam may be used that absorbs less heat from the fixing belt 26. The heating roller 26B may be heated by a heater such as a halogen heater.

The pressure roller 27 may be a tube constructed of a cored bar made of aluminum, iron, or the like and an elastic layer coating the cored bar and made of silicone rubber or the like. A pressurization assembly can move the pressure roller 27 toward the fixing belt 26 to form the fixing nip and move the pressure roller 27 away from the fixing belt 26 to release pressure exerted by pressure roller 27 to the fixing belt 26.

In an operation of the fixing device 25, for example, a driving mechanism drives and rotates the fixing roller 26A clockwise in FIG. 3. The rotation of the fixing roller 26A rotates the fixing belt 26, and the rotation of the fixing belt 26 rotates the pressure roller 27 pressed against the fixing belt 26. The driving mechanism may rotate the heating roller 26B or the pressure roller 27 instead of the fixing roller 26A.

In the fixing device 25, while the fixing belt 26 and the pressure roller 27 are rotated, the heating roller 26B heats the outer circumferential surface of the fixing belt 26 to a predetermined temperature. When the sheet S bearing the unfixed toner image passes through the fixing nip, the fixing belt 26 and the pressure roller 27 apply heat and pressure to the sheet S at the fixing nip, melting and fixing the toner image on the sheet S. When the sheet S bearing the fixed toner image is ejected from the fixing nip, the sheet S may wrap around the fixing belt 26. In such a case, the fixing separator such as a separation claw separates the sheet S from the fixing belt 26. Similarly, a pressure roller side separator such as a pressure roller side separation claw separates the sheet S wrapping around the pressure roller 27 from the pressure roller 27.

Next, a snap ring according to the present embodiment is described.

In the present embodiment, snap rings are set to the shaft of the fixing roller 26A in the fixing device 25 as an example. The snap rings may be similarly set to other rollers such as the heating roller 26B or the pressure roller 27 in the fixing device 25. In addition, the snap rings according to the present embodiment may be set to a shaft of a rotator in a rotator device other than the fixing device in the image forming apparatus 1, such as a shaft of the photoconductor, the support rollers 14, 15, and 16 that support the intermediate transfer belt 10, the rollers 231 and 232 that support the secondary transfer belt 24, the feed rollers 42 and 50, the separation roller pair 45 and 52, the conveyance rollers 47, the registration roller pair 49, the ejection roller pair 56, and the developing roller. The snap rings may be set to a shaft of a rotator in the sheet feed table 200, the scanner 300, and the ADF 400 as the rotator device. The snap rings according to the present embodiment may be also set to a shaft of a rotator in a rotator device other than the rotator devices in the image forming apparatus.

Figure 4:
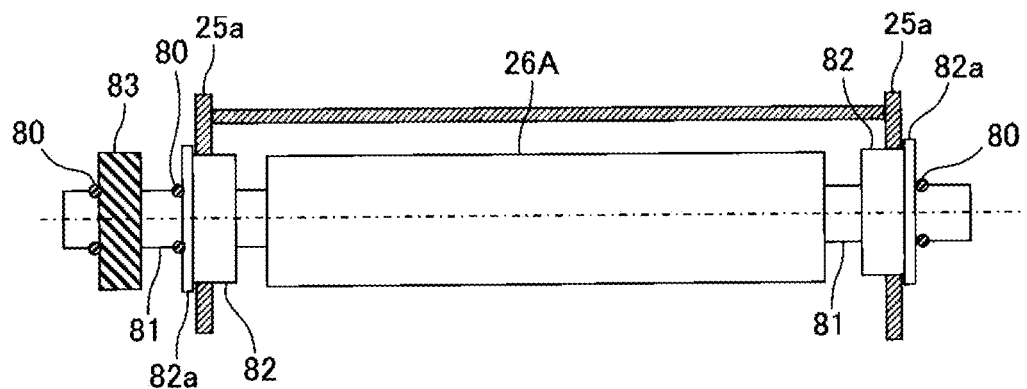
FIG. 4 is a front view of a fixing roller with snap rings according to an embodiment of the present disclosure, viewed from the radial direction of a fixing roller shaft.

FIG. 4 is a front view of the fixing roller 26A with the snap rings according to the present embodiment, viewed from a radial direction orthogonal to the axial direction of a fixing roller shaft 81.

Bearings 82 are attached to the fixing frame 25a of the fixing device 25 to support both ends of the fixing roller shaft 81 that is the shaft of the fixing roller 26A in the present embodiment. The bearing 82 includes a flange 82a that comes into contact with an outer surface of the fixing frame 25a in the axial direction of the fixing roller shaft 81, and the flange 82a is attached to the fixing frame 25a to stop a displacement of the bearing 82 toward the inside of the fixing device 25 in the axial direction of the fixing roller shaft 81. The snap rings 80 are set to the fixing roller shaft 81 supported by the bearings 82 so as to contact the outer surfaces of the bearings 82 in the axial direction. As a result, the snap rings 80 and the flanges 82a of the bearings 82 restrict a displacement of the fixing roller shaft 81 with respect to the fixing frame 25a in the axial direction.

Figure 5:
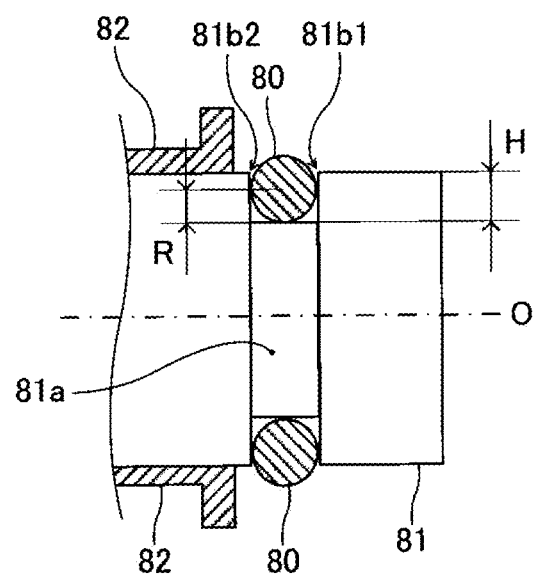
FIG. 5 is a partially enlarged view of the fixing roller shaft with a snap ring according to the embodiment, viewed from the radial direction of the fixing roller shaft.

FIG. 5 is a partially enlarged view of the fixing roller shaft 81 with the snap ring 80, viewed from the radial direction of the fixing roller shaft 81.

As illustrated in FIG. 5, the snap ring 80 is set to the fixing roller shaft 81 having a columnar shape or a cylindrical shape and including a groove to which the snap ring 80 is set. That is, the snap ring 80 of the present embodiment is set so as to enter the groove in a groove portion 81a. The groove portion 81a is a part of the fixing roller shaft 81 and includes the groove formed around the fixing roller shaft 81, serving as a set portion to which the snap ring 80 is set.

Figure 6A:
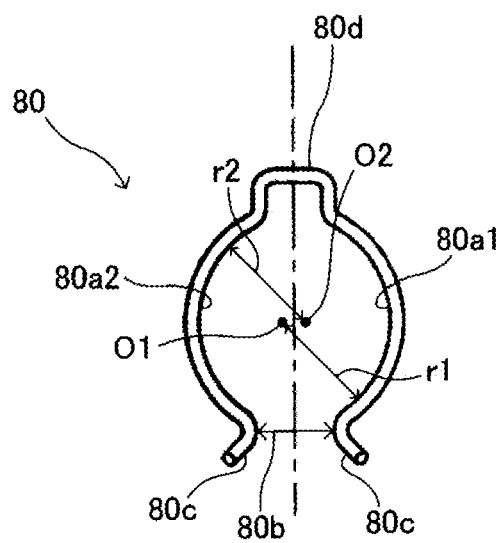
FIG. 6A is a front view of the snap ring that is not set to the set portion of the shaft according to the embodiment of the present disclosure.
Figure 6B:
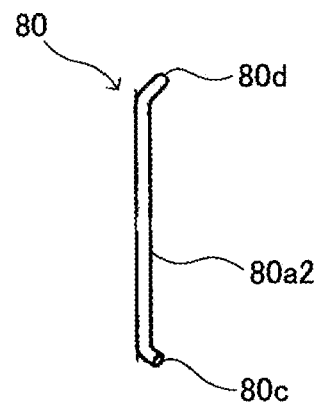
FIG. 6B is a side view of the snap ring of FIG. 6A that is not set to the set portion of the shaft.
Figure 7:
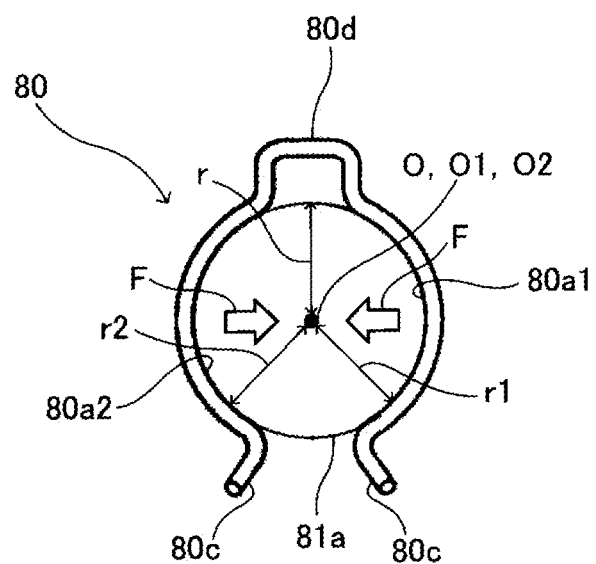
FIG. 7 is a front view of the snap ring that is set to the set portion of the shaft according to the embodiment of the present disclosure.

FIG. 6A is a front view illustrating the snap ring 80 that is not set to the set portion of the fixing roller shaft 81. FIG. 6B is a side view illustrating the snap ring 80 that is not set to the set portion of the fixing roller shaft 81. FIG. 7 is a front view illustrating the snap ring 80 that is set to the set portion of the fixing roller shaft 81.

The snap ring 80 according to the present embodiment includes a first arcuate portion 80a1 and a second arcuate portion 80a2 that face each other and define an inner space of the snap ring 80 to accommodate the groove portion 81a of the fixing roller shaft 81. The snap ring 80 according to the present embodiment has an opening 80b serving as an insertion portion to insert the groove portion 81a of the fixing roller shaft 81 into the inner space in the radial direction of the fixing roller shaft 81. In other words, one end of the first arcuate portion 80a1 and one end of the second arcuate portion 80a2 are away from each other to form the opening 80b serving as the insertion portion to insert the set portion of the shaft of the rotator. The opening 80b of the snap ring 80 that is not set to the set portion, that is, not used, is narrower than the diameter of the groove portion 81a.

When the snap ring 80 according to the present embodiment is set to the groove portion 81a of the fixing roller shaft 81, the groove portion 81a of the fixing roller shaft 81 enters the opening 80b, and the first arcuate portion 80a1 and the second arcuate portion 80a2 contact the groove portion 81a and elastically deform to expand the opening 80b and accommodate the groove portion 81a of the fixing roller shaft 81 in the inner space of the snap ring 80. As illustrated in FIG. 7, the first arcuate portion 80a1 and the second arcuate portion 80a2 sandwich the groove portion 81a of the fixing roller shaft 81 that is in the inner space of the snap ring 80, and elastic deformation restoring forces of the first arcuate portion 80a1 and the second arcuate portion 80a2 hold the groove portion 81a of the fixing roller shaft 81.

A comparative embodiment of the snap ring used in the fixing roller 26A is described. The snap ring is made of metal and by press molding. Such a press-molded snap ring has sufficient strength to restrict the displacement of the fixing roller 26A in the axial direction due to the thrust load and is difficult to come off from the fixing roller shaft 81, that is, has a high holding property. However, since an elastic deformation restoring force of the press-molded snap ring is large, setting the press-molded snap ring to the fixing roller shaft 81 needs a dedicated pliers to elastically deform the snap ring and expand the opening of the snap ring.

Moreover, setting the snap ring 80 to the fixing roller shaft 81 while maintaining the opening of the snap ring 80 expanded by the dedicated pilers needs moving the snap ring 80 toward the fixing roller shaft 81 in the axial direction of the fixing roller shaft 81. This may cause an interference between the snap ring 80 and peripheral parts of the fixing roller shaft 81, causing difficulty of the setting work. As a result, maintenance work such as periodic replacement of the fixing roller 26A may become difficult.

In contrast, the snap ring 80 according to the present embodiment is made of wire. Therefore, the elastic deformation restoring force of the snap ring 80 is smaller than the elastic deformation restoring force of the press molded snap ring. It is easy to elastically deform the snap ring 80, expand the opening 80b of the snap ring 80, and set the snap ring 80 to the fixing roller shaft 81 even if the dedicated pilers are not used. Specifically, pushing the snap ring 80 so that the groove portion 81a of the fixing roller shaft 81 enters the opening 80b of the snap ring 80 causes elastic deformation of the snap ring in which the opening 80b expands along the peripheral surface of the groove in the groove portion 81a of the fixing roller shaft 81 (that is the bottom surface of the groove), and the groove portion 81a of the fixing roller shaft 81 is entered into the inner space of the snap ring 80.

In particular, the snap ring 80 according to the present embodiment includes guides 80c as illustrated in FIG. 6A. One of the guides 80c is a first guide extending from an end of the first arcuate portion 80a1 to form the opening 80b toward the outside of the snap ring 80 in the radial direction of the snap ring 80. The other one of the guides 80c is a second guide extending from an end of the second arcuate portion 80a2 to form the opening 80b toward the outside of the snap ring 80 in the radial direction of the snap ring 80. The guides extend from the ends of the first and second arcuate portions 80a1 and 80a2 in a direction that widens the distance between the guides 80c. When pushing the snap ring 80 so that the groove portion 81a of the fixing roller shaft 81 enters the opening 80b of the snap ring 80 causes elastic deformation of the snap ring in which the opening 80b expands and slides along the peripheral surface of the groove in the groove portion 81a of the fixing roller shaft 81 (that is the bottom surface of the groove), disposing the guides 80c described above efficiently transform a force for pushing the snap ring to a force for expanding the opening 80b. As a result, the snap ring 80 can be smoothly set to the groove portion 81a of the fixing roller shaft 81 in the radial direction of the fixing roller shaft 81.

In addition, as illustrated in FIG. 6A, the guide 80c according to the present embodiment includes a part having a curved shape (that is, a rounded shape) that contacts the fixing roller shaft 81 when the snap ring 80 is set to the groove portion 81a of the fixing roller shaft 81. The above-described configuration enables the snap ring 80 to be more smoothly set to the groove portion 81a of the fixing roller shaft 81. If the part of the guide 80c is a corner portion such as an edge, setting the snap ring 80 to the fixing roller shaft 81 and removing the snap ring from the fixing roller shaft 81 may cause a disadvantage that the snap ring 80 easily damage the fixing roller shaft 81 (particularly, the edge of the groove portion 81a). The part of the guide 80c having the curved shape as in the present embodiment is less likely to damage the fixing roller shaft 81 and less likely to cause the disadvantage due to the damage described above even if the snap ring 80 repeatedly set to and removed from the fixing roller shaft 81.

To remove the snap ring 80 according to the present embodiment from the groove portion 81a of the fixing roller shaft 81, the snap ring 80 is pulled in the radial direction of the fixing roller shaft 81 so that the groove portion 81a of the fixing roller shaft 81 is taken out of the opening 80b. To pull the snap ring 80 according to the present embodiment on the fixing roller shaft 81, the snap ring 80 includes a projection 80d between the first arcuate portion 80a1 and the second arcuate portion 80a2 on the opposite side of the opening 80b. The projection 80d as described above contacts the bearing 82 to securely restrict a displacement of the bearing 82 in the axial direction of the fixing roller shaft 81 when the thrust load is applied to the bearing 82.

Figure 8:
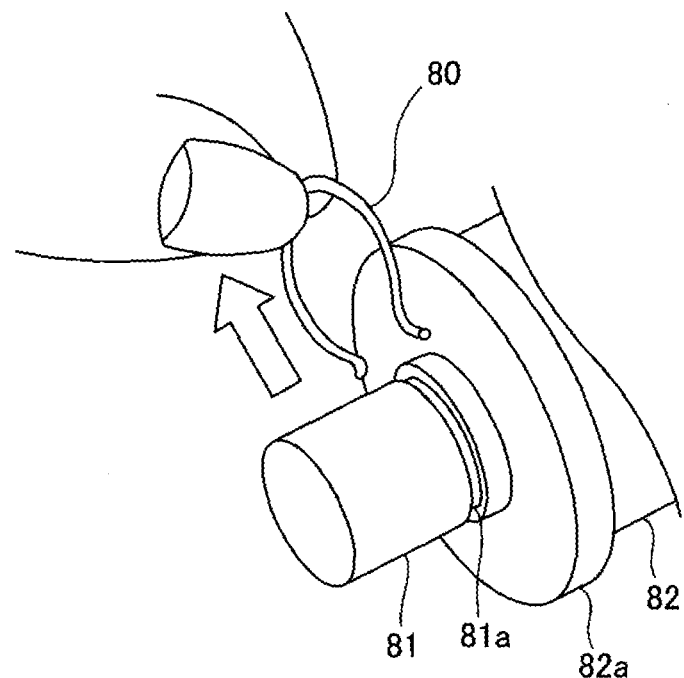
FIG. 8 is an explanatory view illustrating fingers of an operator that grip a projection of the snap ring according to the embodiment of the present disclosure and pulls out the snap ring in the radial direction of the fixing roller shaft.

The above-described projection 80d functions as a handling portion. As illustrated in FIG. 8, an operator can pinch the projection 80d between fingers and easily pull the snap ring 80 in the radial direction of the fixing roller shaft 81. The operator may use a general tool such as needle-nose pliers to hold or hook the projection 80d and pull the snap ring 80 in the radial direction of the fixing roller shaft 81.

The snap ring 80 according to the present embodiment may be made of, for example, stainless steel wire such as SUS 304-WPB ($\varphi$1.2) that is the Japanese Industrial Standards (JIS). The material of the snap ring 80 (that is wire material) is not limited to this, and other materials such as steel wires, for example, SW-C and SWP-B (JIS), or plated steel wire may also be used. An example of material of the snap ring 80 according to the present embodiment is metal having heat resistance because the snap ring 80 is set to the fixing roller shaft 81 in the fixing device 25 and used under a high temperature environment. However, depending on the intended use of the snap ring, the snap ring may be made of another material such as resin.

As described above, pushing the snap ring 80 according to the present embodiment in the radial direction of the fixing roller shaft 81 elastically deforms the first arcuate portion 80a1 and the second arcuate portion 80a2 and sets the snap ring 80 to the fixing roller shaft 81. Additionally, the elastic deformation restoring forces of the first arcuate portion 80a1 and the second arcuate portion 80a2 are sufficient forces for the snap ring 80 to pinch the fixing roller shaft 81. A method for manufacturing the above-described snap ring 80 may be bending wire material that is a simple and inexpensive manufacturing method, but the method is not limited to this. Depending on the material of the snap ring, the manufacturing method is appropriately selected. As long as the manufacturing method can make the snap ring having the same elastic deformation restoring force as the snap ring according to the present embodiment, the manufacturing method may be, for example, the press molding.

As illustrated in FIG. 6A, the snap ring 80 according to the present embodiment includes a snap ring body including the first arcuate portion 80a1 and the second arcuate portion 80a2. When the snap ring 80 is not set to the fixing roller shaft 81, that is, when the snap ring 80 is not used, the radius r1 of curvature of the first arcuate portion 80a1 and the radius r2 of curvature of the second arcuate portion 80a2 are substantially equal to the radius r of curvature of the groove portion 81a of the fixing roller shaft 81. In addition, the center O1 of curvature of the first arcuate portion 80a1 is nearer to the second arcuate portion 80a2 than the first arcuate portion 80a1, and the center O2 of curvature of the second arcuate portion 80a2 is nearer to the first arcuate portion 80a1 than the second arcuate portion 80a2.

Figure 9A:
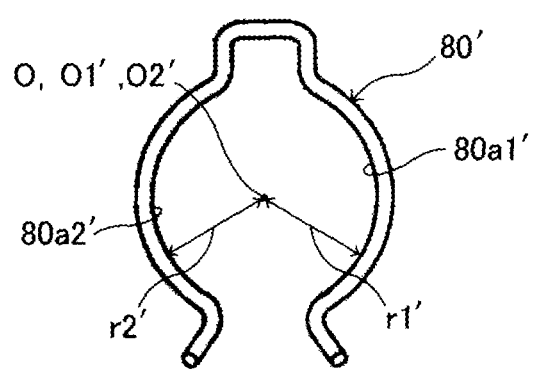
FIG. 9A is a front view of a snap ring of a comparative embodiment, which is not set to a shaft, including a first arcuate portion and a second arcuate portion that have the same center of curvature and a radius of curvature smaller than a radius of curvature of a groove portion of a fixing roller shaft and sandwich the groove portion of the fixing roller shaft.

To describe an advantage of the above-described configuration, a comparative embodiment is described below with reference to FIG. 9A. The groove portion 81a of the fixing roller shaft 81 is sandwiched by a first arcuate portion 80a1' and a second arcuate portion 80a2' in a snap ring 80' of the comparative embodiment. As illustrated in FIG. 9A, when the snap ring 80' is not set to the fixing roller shaft 81, that is, when the snap ring 80' is not used, the radius r1' of curvature of the first arcuate portion 80a1' and the radius r2' of curvature of the second arcuate portion 80a2' are smaller than the radius r of curvature of the groove portion 81a. In addition, the center O1' of curvature of the first arcuate portion 80a1' and the center O2' of curvature of the second arcuate portion 80a2' are at the same position. The above-described snap ring 80' has following disadvantages.

Figure 9B:
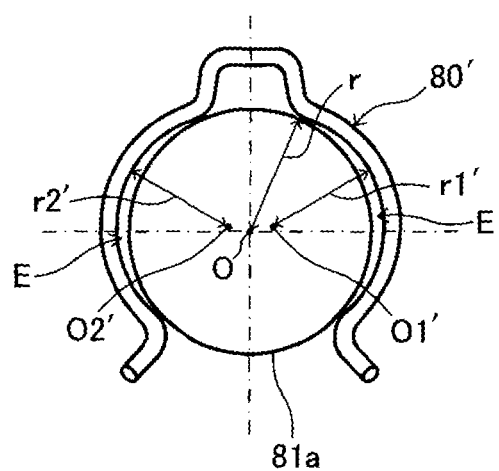
FIG. 9B is a front view of the snap ring illustrated in FIG. 9A, which is set to the shaft.

That is, when the snap ring 80' having the above-described shape is set to the groove portion 81a of the fixing roller shaft 81, each of the first arcuate portion 80a1' and the second arcuate portion 80a2' contacts the groove portion 81a at two positions as illustrated in FIG. 9B. In this case, the remaining portions of the first arcuate portion 80a1' and the second arcuate portion 80a2' do not contact the groove portion 81a, for example, as illustrated by the reference E in FIG. 9B. The above-described configuration does not give the operator sufficient sense of fitting the snap ring 80' to the groove portion 81a of the fixing roller shaft 81 correctly. The operator can not clearly confirm whether the snap ring 80' is set to the groove portion 81a of the fixing roller shaft 81 when the operator sets the snap ring 80' to the groove portion 81a. Setting failure of the snap ring 80' is likely to occur.

In contrast, when the snap ring 80 having the shape described in the present embodiment is set to the groove portion 81a of the fixing roller shaft 81, a curved surface of the first arcuate portion 80a1 and a curved surface of the second arcuate portion 80a2 in the snap ring 80 is in contact along a curved surface of the groove portion 81a of the fixing roller shaft 81. The above-described configuration can reduce a gap between the groove portion 81a and the snap ring 80 as illustrated in FIG. 7 and give the operator the sufficient sense of fitting the snap ring 80 to the groove portion 81a of the fixing roller shaft 81 correctly. As a result, the operator can easily and clearly confirm whether the snap ring 80 is correctly set to the groove portion 81a of the fixing roller shaft 81 when the operator sets the snap ring 80 to the groove portion 81a, which prevents the setting failure of the snap ring 80.

In addition, as illustrated in FIG. 9, the first arcuate portion 80a1' and the second arcuate portion 80a2' in the snap ring 80' include a floating portion having a gap between the groove portion 81a and the first arcuate portion 80a1' and the second arcuate portion 80a2'. A diagonally lower part of the floating portion hits an edge of a wall 81b1 (see FIG. 5) of the groove portion 81a, and most of the floating portion is out of the groove portion 81a. When the bearing 82 is pressed in the axial direction of the fixing roller shaft 81 by the thrust load and push the snap ring 80' under the above-described state, the diagonally lower part of the floating portion that hits the edge of the wall 81b1 slides along the edge of the wall 81b1 of the groove portion 81a. This movement brings a part of the snap ring 80' entering the groove portion 81a onto the edge of the wall 81b1, and the snap ring 80' may come off the groove portion 81a.

In particular, as illustrated in FIG. 4, the fixing device 25 according to the present embodiment includes a drive transmission mechanism that transmits a driving force to the fixing roller shaft 81 and uses a helical gear 83 to reduce noise. In the helical gear 83, the relation between the driving torque and the gear tooth orientation generates a relatively large thrust load that is applied to the fixing roller shaft 81. As a result, a relatively large axial force is applied to the snap ring 80', and the snap ring 80' is likely to come off from the groove portion 81a.

The snap ring 80 according to the present embodiment has little gap between the groove portion 81a and the first and second arcuate portions 80a1 and 80a2 and no part diagonally hitting the edge of the wall 81b1 of the groove portion 81a. As a result, even when the bearing 82 is pressed in the axial direction of the fixing roller shaft 81 by the thrust load and push the snap ring 80, it is difficult to bring a part of the snap ring 80 entering the groove portion 81a onto the edge of the wall 81b1, and the snap ring 80 is hard to come off the groove portion 81a.

As illustrated in FIG. 5, the groove portion 81a of the fixing roller shaft 81 has two walls 81b1 and 81b2 away from each other in the axial direction of the fixing roller shaft 81. The snap ring 80 according to the present embodiment contacts the bearing 82 serving as a contacted member. A height H of the wall 81b1 opposite the wall 81b2 near the bearing 82 is equal to or larger than a radius R of a cross-sectional circle of the snap ring body, that is, the first arcuate portion 80a1 and the second arcuate portion 80a2. The height H is a height from the bottom surface of the groove of the groove portion 81a to the edge of the wall 81b1. In the above-described configuration, even when the bearing 82 is pressed in the axial direction of the fixing roller shaft 81 by the thrust load and push the snap ring 80, it is difficult to bring the snap ring body that enters the groove portion 81a onto the edge of the wall 81b1, and the snap ring 80 is hard to come off the groove portion 81a. The reason is as follows.

Figure 10A:
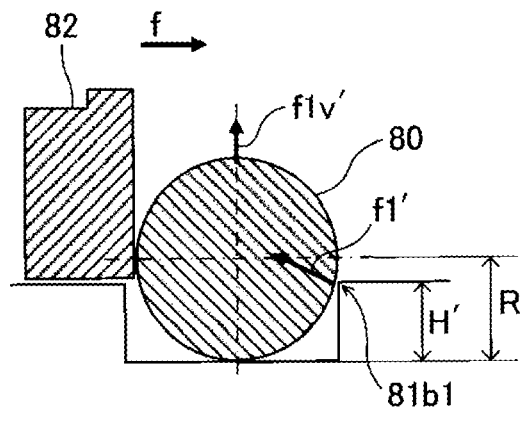
FIG. 10A is a schematic view illustrating a configuration in which a height of a wall of the groove in the fixing roller shaft is smaller than a radius of cross-sectional circle of a snap ring body according to a comparative embodiment.

FIG. 10A is a schematic view illustrating a comparative embodiment in which a height H' of the wall 81b1 in the groove portion 81a of the fixing roller shaft 81 is smaller than the radius R of the cross-sectional circle of the snap ring body.

In the configuration illustrated in FIG. 10A, the edge of the wall 81b1 comes into contact with a peripheral surface of the snap ring body that enters the groove portion 81a of the fixing roller shaft 81. The height from the bottom of the groove of the groove portion 81a to a contact point at which the edge of the wall 81b1 contacts the peripheral surface of the snap ring body is smaller than a half of the radius R of the cross-sectional circle of the snap ring body. In this case, as illustrated in FIG. 10A, the snap ring 80 receives a force f1' including a force component f1v' in the radial direction of the fixing roller shaft 81 from the edge of the wall 81b1 of the groove portion 81a of the fixing roller shaft 81 when the bearing 82 is pressed in the axial direction of the fixing roller shaft 81 by the thrust load and pushes the snap ring 80 with a force f in the axial direction. The force component f1v' in the radial direction works to push the snap ring 80 out of the groove portion 81a. Therefore, the force component f1v' easily brings the snap ring body that enters the groove portion 81a onto the edge of the wall 81b1, and the snap ring 80 may come off the groove portion 81a.

Figure 10B:
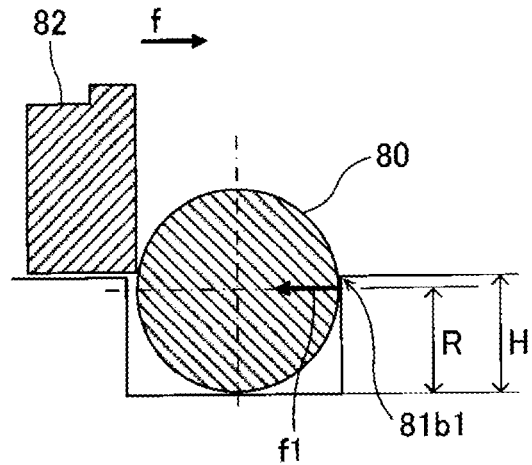
FIG. 10B is a schematic view illustrating a configuration in which the height of the wall of the groove in the fixing roller shaft is equal to or larger than the radius of cross-sectional circle of the snap ring body according to the embodiment of the present disclosure.

FIG. 10B is a schematic view illustrating the configuration of the present embodiment in which a height H of the wall 81b1 in the groove portion 81a of the fixing roller shaft 81 is equal to or larger than the radius R of the cross-sectional circle of the snap ring body.

In the configuration illustrated in FIG. 10B, the edge of the wall 81b1 is at a position equal to or higher than a half of the snap ring body that enters the groove portion 81a of the fixing roller shaft 81. As illustrated in FIG. 10B, the snap ring 80 entering the groove portion 81a of the fixing roller shaft 81 comes into contact with an inner wall surface of the wall 81b1 of the groove portion 81a. As a result, as illustrated in FIG. 10B, the snap ring 80 does not receive a force from the edge of the wall 81b1 of the groove portion 81a of the fixing roller shaft 81 and receives a force f1 not including the force component f1v' in the radial direction from the inner wall surface of the wall 81b1 of the groove portion 81a when the bearing 82 is pressed in the axial direction of the fixing roller shaft 81 by the thrust load and pushes the snap ring 80 with a force f in the axial direction. Since the snap ring 80 does not receive the force f1v' that works to push the snap ring 80 out of the groove portion 81a, it is difficult to bring the snap ring body that enters the groove portion 81a onto the edge of the wall 81b1, and the snap ring 80 is hard to come off the groove portion 81a.

Figure 11:
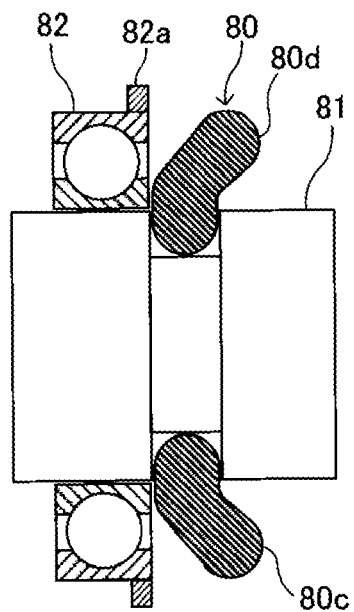
FIG. 11 is a partial cross-sectional view of the fixing roller shaft to which the snap ring is set and a bearing, viewed from the radial direction of the fixing roller shaft.

The snap ring 80 according to the present embodiment includes the projection 80d as illustrated in FIG. 6B. The projection 80d extends from the snap ring body toward a direction inclined with respect to an imaginary plane including the first arcuate portion 80a1 and the second arcuate portion 80a2 of the snap ring body, that is, the imaginary plane parallel to a paper surface in FIG. 6A and FIG. 7. As illustrated in FIG. 11, due to the above-described shape, the projection 80d projects in a direction away from the bearing 82 and forms a gap between the bearing 82 and the projection 80d when the snap ring 80 is set to the fixing roller shaft 81. As a result, the operator uses fingers or the general tool such as the needle-nose pilers and can easily hold the projection 80d to push or pull the projection 80d when the operator sets or removes the snap ring 80 to or from the fixing roller shaft 81.

The bearing 82 of the present embodiment is a ball bearing that is a rolling bearing including an inner ring and an outer ring. The inner ring is attached to the fixing roller shaft 81, and the outer ring is attached to the fixing frame 25a. In this case, since the inner ring of the bearing 82 rotates with the snap ring 80 set to the fixing roller shaft 81, the snap ring 80 rotates relative to the outer ring of the bearing 82. Therefore, if the projection 80d that is set to the snap ring body is not inclined, the projection 80d comes into contact with the bearing 82 when the snap ring 80 is set to the fixing roller shaft 81. When the fixing roller is driven to rotate, the snap ring 80 slides on the outer ring of the bearing 82. The snap ring 80 sliding on the outer ring of the bearing 82 may cause disadvantages such as generation of abnormal noise, increase in rotational load, and damage to the snap ring 80 and the bearing 82.

In contrast, the snap ring 80 of the present embodiment has a gap between the projection 80d and the outer ring of the bearing 82 when the snap ring 80 is set to the fixing roller shaft 81 as illustrated in FIG. 11. The projection 80d does not come into contact with the bearing 82. Therefore, the projection 80d of the snap ring 80 does not slide on the outer ring of the bearing 82 when the fixing roller is driven to rotate, and the disadvantages caused by the snap ring 80 sliding on the outer ring of the bearing 82 can be solved.

The snap ring 80 according to the present embodiment also includes the guides 80c as illustrated in FIG. 6B. The guide 80c also extends from the snap ring body toward a direction inclined with respect to the imaginary plane including the first arcuate portion 80a1 and the second arcuate portion 80a2 of the snap ring body, that is, the imaginary plane parallel to a paper surface in FIG. 6A and FIG. 7. Due to the above-described shape, the guide 80c extends in a direction inclined with respect to an insertion direction in which the groove portion 81a of the fixing roller shaft 81 is inserted into the opening 80b of the snap ring 80. As a result, even if the opening 80b of the snap ring 80 deviates a little from the groove portion 81a of the fixing roller shaft 81 in the axial direction of the fixing roller shaft 81 and is pushed to the groove portion 81a, pushing the snap ring 80 causes the guide 80c to hit the edge of the groove portion 81a and slide on the wall of the groove in the groove portion 81a, the deviation between the groove portion 81a and the opening 80b is corrected, and the groove portion 81a of the fixing roller shaft 81 is inserted into the opening 80b. That is, the work of attaching the snap ring 80 becomes easy.

Similar to the projection 80d described above, the guide 80c extending in the direction inclined as described above has a gap between the guide 80c and the outer ring of the bearing 82 when the snap ring 80 is set to the fixing roller shaft 81 as illustrated in FIG. 11. The guide 80c does not come into contact with the bearing 82. Therefore, the snap ring 80 does not slide on the outer ring of the bearing 82 when the fixing roller is driven to rotate, and the disadvantages such as the generation of abnormal noise, the increase in rotational load, and the damage to the snap ring 80 and the bearing 82 can be solved.

Figure 12A:
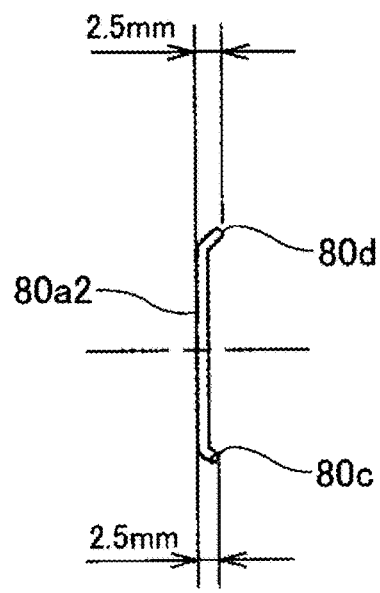
FIG. 12A is a side view illustrating examples of dimensions of the snap ring that is not set to the set portion of the shaft.

Hereinafter, examples of the dimensions of the snap ring 80 and the fixing roller shaft 81 in the present embodiment are described with reference to FIGS. 12A, 12B, and 13. Needless to say, the dimensions are not limited to the following examples.

The snap ring 80 is made by bending a metal wire having a diameter of 1 mm. As illustrated in FIG. 12A, the radius r1 of curvature of the first arcuate portion 80a1 and the radius r2 of the second arcuate portion 80a2 are the same and 9.5 mm when the snap ring 80 is not set to the fixing roller shaft 81. The center O1 of curvature of the first arcuate portion 80a1 is closer to the second arcuate portion 80a2 than the first arcuate portion 80a1 by 1 mm from the center position of the snap ring 80, and the center O2 of curvature of the second arcuate portion 80*a*2 is closer to the first arcuate portion 80*a*1 than the second arcuate portion 80*a*2 by 1 mm from the center position of the snap ring 80 when the snap ring 80 is not set to the fixing roller shaft 81. The size of the opening 80*b* is 7 mm when the snap ring 80 is not set to the fixing roller shaft 81. Each of guides 80*c* extends so as to widen the distance between the guides 80*c* toward the outside of the snap ring 80 in the radial direction of the snap ring body at an angle of 45° with respect to the axis D of symmetry of the snap ring 80 in plan view when the snap ring 80 is not set to the fixing roller shaft 81. The projection 80*d* is formed so as to have a substantially rectangular shape and has an inner dimension of 5 mm in the lateral direction orthogonal to the axis D of symmetry of the snap ring 80.

Figure 12B:
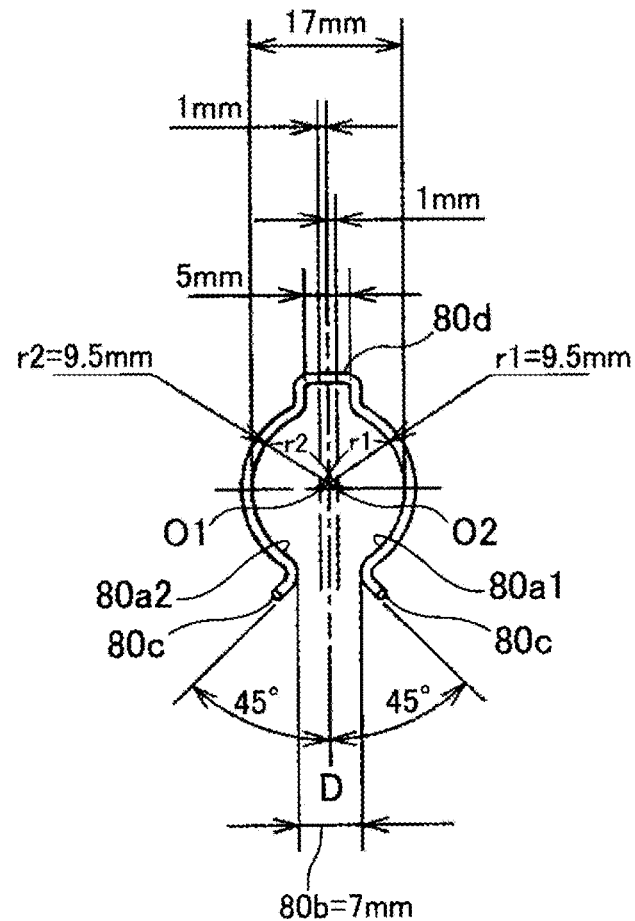
FIG. 12B is a front view illustrating examples of dimensions of the snap ring that is not set to the set portion of the shaft.
Figure 13:
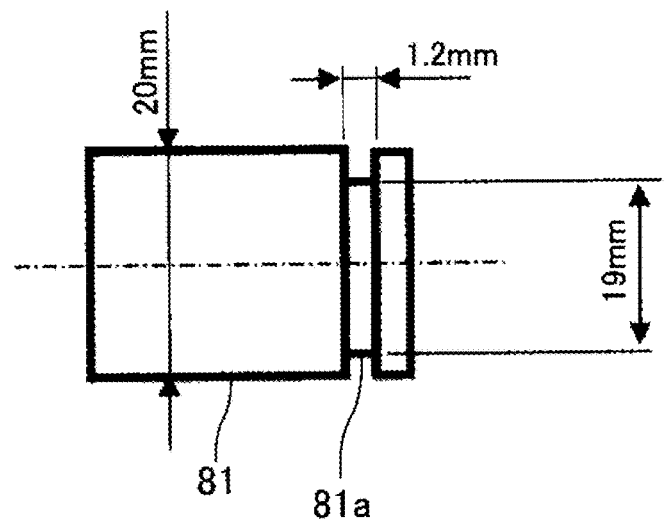
FIG. 13 is a cross-sectional view of the fixing roller shaft to which the snap ring is set, illustrating examples of dimensions of the fixing roller shaft.

As illustrated in FIG. 12B, the guide 80*c* and the projection 80*d* extends from the snap ring body toward the direction inclined with respect to the imaginary plane including the first arcuate portion 80*a*1 and the second arcuate portion 80*a*2 of the snap ring body, that is, the imaginary plane parallel to the paper surface in FIG. 6A and FIG. 7, and an amount of projection from the imaginary plane is 2.5 mm.

The fixing roller shaft 81 to which the snap ring 80 is set is a columnar member having a diameter of 20 mm, and the bottom of the groove in the groove portion 81*a* draws a circle having a diameter of 19 mm (that is, the radius r in the groove portion 81*a*=9.5 mm).

The configurations according to the above-described embodiment are not limited thereto and can achieve the following aspects effectively.

First Aspect

In a first aspect, a snap ring such as the snap ring 80 is configured to be set to a set portion (for example, the groove portion 81*a*) of a shaft (for example, the fixing roller shaft 81) of a rotator (for example, the fixing roller 26A) from a direction orthogonal to an axial direction of the shaft (for example, the radial direction of the fixing roller shaft 81). The snap ring in the first aspect includes a snap ring body. The snap ring body includes a first arcuate portion such as the first arcuate portion 80*a*1 and a second arcuate portion such as the second arcuate portion 80*a*2. The first arcuate portion and the second arcuate portion face each other, are elastically deformable in a direction away from each other, are configured to hold the set portion by elastic deformation restoring force. The snap ring body have one end of the first arcuate portion and one end of the second arcuate portion that are away from each other to form an insertion portion such as the opening 80*b* to insert the set portion. The first arcuate portion has the same radius (for example, the radius r1 and the radius r2) of curvature as the second arcuate portion and the same radius (for example, the radius r) of curvature as the set portion when the snap ring is not used. A center (for example, the center O1) of curvature of the first arcuate portion is closer to the second arcuate portion than the first arcuate portion. A center (for example, the center O2) of curvature of the second arcuate portion is closer to the first arcuate portion than the second arcuate portion.

The snap ring 80' according to the comparative embodiment also includes the first arcuate portion 80*a*1' and the second arcuate portion 80*a*2'. When the snap ring 80' is not used, the radius of curvature of the set portion such as the groove portion 81*a* is larger than the radius r1' of curvature of the first arcuate portion 80*a*1' and the radius r2' of curvature of the second arcuate portion 80*a*2'. In addition, the center O1' of curvature of the first arcuate portion 80*a*1' and the center O2' of curvature of the second arcuate portion 80*a*2' are at the same position. When the snap ring 80' having the above-described shape is set to the set portion of the shaft, each of the first arcuate portion 80*a*1' and the second arcuate portion 80*a*2' contacts the set portion at two positions, and the remaining portions of the first arcuate portion 80*a*1' and the second arcuate portion 80*a*2' do not contact the set portion. The above-described configuration does not give the operator sufficient sense of fitting the snap ring 80' to the set portion of the shaft correctly. The operator does not correctly set the snap ring to the set portion of the shaft, and the setting failure of the snap ring 80' is likely to occur.

The snap ring according to the first aspect includes the first arcuate portion and the second arcuate portion. When the snap ring is not used, the radius of curvature of the set portion of the shaft is substantially equal to the radius of curvature of the first arcuate portion and the radius of curvature of the second arcuate portion. In addition, the center of curvature of the first arcuate portion is nearer to the second arcuate portion than the first arcuate portion, and the center of curvature of the second arcuate portion is nearer to the first arcuate portion than the second arcuate portion. When the snap ring having the shape described above is set to the set portion of the shaft, a curved surface of the first arcuate portion and a curved surface of the second arcuate portion is in contact along a curved surface of the set portion of the shaft. The above-described configuration can reduce a gap between the set portion and the snap ring and give the operator the sufficient sense of fitting the snap ring to the set portion of the shaft correctly. The operator can easily and correctly set the snap ring to the set portion of the shaft.

Second Aspect

In a second aspect, the snap ring according to the first aspect further includes guides such as the guides 80*c*. The guides are a first guide and a second guide. The first guide extends from the one end of the first arcuate portion forming the insertion portion in a radially outward direction of the first arcuate portion and a direction inclined with respect to an insertion direction in which the set portion is inserted into the snap ring. The second guide extends from the one end of the second arcuate portion forming the insertion portion in a radially outward direction of the second arcuate portion and a direction inclined with respect to the insertion direction in which the set portion is inserted into the snap ring.

According to the second aspect, even if the insertion portion of the snap ring deviates a little from the set portion of the shaft in the axial direction of the shaft and the snap ring is pushed to the set portion when the set portion of the shaft is inserted into the insertion portion of the snap ring, pushing the snap ring causes the guide to contact the set portion and guide the snap ring to correct the deviation between the set portion and the insertion portion, and the set portion of the shaft is inserted into the insertion portion. That is, the work of attaching the snap ring becomes easy.

Third Aspect

In a third aspect, a snap ring such as the snap ring 80 is configured to be set to a set portion (for example, the groove portion 81*a*) of a shaft (for example, the fixing roller shaft 81) of a rotator (for example, the fixing roller 26A) from a direction orthogonal to an axial direction of the shaft (for example, the radial direction of the fixing roller shaft 81). The snap ring in the third aspect includes a snap ring body. The snap ring body includes a first arcuate portion such as the first arcuate portion 80*a*1 and a second arcuate portion such as the second arcuate portion 80*a*2. The first arcuate portion and the second arcuate portion face each other, are elastically deformable in a direction away from each other, are configured to hold the set portion by an elastic deformation restoring force, and have one end of the first arcuate portion and one end of the second arcuate portion that are away from each other to form an insertion portion such as the opening 80*b* to insert the set portion. In addition, the snap ring according to the third aspect further includes guides such as the guides 80*c*. The guides are a first guide and a second guide. The first guide extends from the one end of the first arcuate portion forming the insertion portion in a radially outward direction of the first arcuate portion and a direction inclined with respect to an insertion direction in which the set portion is inserted into the snap ring. The second guide extends from the one end of the second arcuate portion forming the insertion portion in a radially outward direction of the second arcuate portion and a direction inclined with respect to the insertion direction in which the set portion is inserted into the snap ring.

According to the third aspect, even if the insertion portion of the snap ring deviates a little from the set portion of the shaft in the axial direction of the shaft and the snap ring is pushed to the set portion when the set portion of the shaft is inserted into the insertion portion of the snap ring, pushing the snap ring causes the guide to contact the set portion and guide the snap ring to correct the deviation between the set portion and the insertion portion, and the set portion of the shaft is inserted into the insertion portion. That is, the work of attaching the snap ring becomes easy.

Fourth Aspect

In a fourth aspect, each of the guides in the snap ring according to the second or third aspect includes a part having a curved shape configured to contact the shaft when the snap ring is set to the set portion.

According to the fourth aspect, the snap ring can be smoothly set to the set portion of the shaft. If the part of the guide is a corner portion such as an edge, setting the snap ring to the shaft and removing the snap ring from the shaft may cause a disadvantage that the snap ring easily damages the shaft. The part of the guide having the curved shape is less likely damage the shaft and less likely cause the disadvantage due to the damage described above even if the snap ring repeatedly set to and removed from the shaft.

Fifth Aspect

In a fifth aspect, the snap ring according to any one of the first to fourth aspects further includes a handling portion such as the projection 80*d*. The handling portion is disposed between another end of the first arcuate portion and another end of the second arcuate portion. The handling portion extends in a direction inclined with respect to an imaginary plane including the first arcuate portion and the second arcuate portion.

According to the fifth aspect, the handling portion projects in a direction away from a contacted member such as the bearing 82 and forms a gap between the contacted member and the handling portion when the snap ring is set to the shaft. As a result, the operator uses fingers or the general tool such as the needle-nose pilers and can easily hold the handling portion to push or pull the handling portion when the operator sets or removes the snap ring to or from the shaft.

Sixth Aspect

In a sixth aspect, a snap ring such as the snap ring 80 is configured to be set to a set portion (for example, the groove portion 81*a*) of a shaft (for example, the fixing roller shaft 81) of a rotator (for example, the fixing roller 26A) from a direction orthogonal to an axial direction of the shaft (for example, the radial direction of the fixing roller shaft 81). The snap ring in the sixth aspect includes a snap ring body.

The snap ring body includes a first arcuate portion such as the first arcuate portion 80*a*1 and a second arcuate portion such as the second arcuate portion 80*a*2. The first arcuate portion and the second arcuate portion face each other, are elastically deformable in a direction away from each other, are configured to hold the set portion by an elastic deformation restoring force, and have one end of the first arcuate portion and one end of the second arcuate portion that are away from each other to form an insertion portion such as the opening 80*b* to insert the set portion. The snap ring further includes a handling portion such as the projection 80*d*. The handling portion is disposed between another end of the first arcuate portion and another end of the second arcuate portion. The handling portion extends in a direction inclined with respect to an imaginary plane including the first arcuate portion and the second arcuate portion.

According to the sixth aspect, the handling portion projects in a direction away from a contacted member such as the bearing 82 and forms a gap between the contacted member and the handling portion when the snap ring is set to the shaft. As a result, the operator uses fingers or the general tool such as the needle-nose pilers and can easily hold the handling portion to push or pull the handling portion when the operator sets or removes the snap ring to or from the shaft.

Seventh Aspect

In a seventh aspect, the snap ring body of the snap ring according to any one of the first to sixth aspects is a metal wire having a uniform cross-sectional shape in a longitudinal direction of the metal wire.

According to the seventh aspect, the operator can push the snap ring in the radial direction of the shaft to set the snap ring to the set portion of the shaft. Additionally, the snap ring can have the elastic deformation restoring force that is an enough force for the first arcuate portion and the second arcuate portion to pinch the shaft.

Eighth Aspect

In an eight aspect, a rotator device includes a rotator (for example, the fixing roller 26A) having a shaft (for example, the fixing roller shaft 81) with a set portion (for example, the groove portion 81*a*) and the snap ring according to any one of the first to seventh aspects.

In the rotator device according to the eighth aspect, the snap ring can be smoothly set to the set portion of the shaft.

Ninth Aspect

In a ninth aspect, the set portion to which the snap ring is set in the rotator device according to the eighth aspect is a groove (for example, the groove in the groove portion 81*a*) on the shaft.

According to the ninth aspect, even if a gripping force of the snap ring is relatively weak, the snap ring can sufficiently restrict the displacement of the shaft in the axial direction caused by the thrust load.

Tenth Aspect

In a tenth aspect, the rotator device according to the ninth aspect further includes a contacted member (for example, the bearing 82) movable relative to the shaft in an axial direction of the shaft. The snap ring body is made of a wire having a cross-sectional circle. The groove has two walls including a first wall near the contacted member such as the wall 81*b*2 and a second wall farther form the contacted member such as the wall 81*b*1 than the first wall, and a height of the second wall is equal to or larger than a radius (for example, the radius R) of the cross-sectional circle of the snap ring body.

According to the tenth aspect, even when the contacted member is pressed in the axial direction of the fixing roller shaft 81 by the thrust load and push the snap ring, it is difficult to bring the body of the snap ring that enters the groove portion onto the edge of the wall, and the snap ring is hard to come off the groove portion.

Eleventh Aspect

In an eleventh aspect, the rotator device according to any one of the eighth to tenth aspects includes a rotator having a shaft, a rolling bearing (for example, the ball bearing) movable relative to the shaft in an axial direction of the shaft, and the snap ring according to the fifth or sixth aspect.

According to the eleventh aspect, the snap ring has a gap between the handling portion of the snap ring and the outer ring of the rolling bearing when the snap ring is set to the shaft. The handling portion does not come into contact with the rolling bearing. Therefore, the handling portion of the snap ring does not slide on the outer ring of the bearing when the rotator is driven to rotate, which can solve the disadvantage such as the generation of abnormal noise, the increase in rotational load, and the damage to the snap ring and the bearing.

Twelfth Aspect

In a twelfth aspect, a fixing device such as the fixing device 25 includes two rotators to form the fixing nip at which an image is fixed on a recording medium and the snap ring according to any one of the first to seventh aspects set to at least one of the two rotators.

In the fixing device according to the twelfth aspect, the snap ring can be smoothly set to the set portion of the shaft.

Thirteenth Aspect

In a thirteenth aspect, an image forming apparatus such as the image forming apparatus 1 includes the rotator device according to any one of the eighth to eleventh aspects.

In the image forming apparatus according to the thirteenth aspect, the snap ring can be smoothly set to the set portion of the shaft.

Fourteenth Aspect

In a fourteenth aspect, a manufacturing method includes a process processing a wire to make a snap ring described below. That is, the snap ring such as the snap ring 80 is set to a set portion (for example, the groove portion 81*a*) of a shaft (for example, the fixing roller shaft 81) of a rotator (for example, the fixing roller 26A) from a direction orthogonal to an axial direction of the shaft (for example, the radial direction of the fixing roller shaft 81). The snap ring includes a snap ring body. The snap ring body includes a first arcuate portion such as the first arcuate portion 80*a*1 and a second arcuate portion such as the second arcuate portion 80*a*2. The first arcuate portion and the second arcuate portion face each other, are elastically deformable in a direction away from each other, are configured to hold the set portion by an elastic deformation restoring force, and have one end of the first arcuate portion and one end of the second arcuate portion that are away from each other to form an insertion portion such as the opening 80*b* to insert the set portion. The first arcuate portion has the same radius (for example, the radius r1 and the radius r2) of curvature as the second arcuate portion and the same radius (for example, the radius r) of curvature as the set portion when the snap ring is not used. A center (for example, the center O1) of curvature of the first arcuate portion is closer to the second arcuate portion than the first arcuate portion. A center (for example, the center O2) of curvature of the second arcuate portion is closer to the first arcuate portion than the second arcuate portion.

According to the fourteenth aspect, the snap ring that the operator can easily and correctly set to the set portion of the shaft can be easily made.

Fifteenth Aspect

In a fifteenth aspect, a manufacturing method includes a process processing a wire to make a snap ring described below. That is, the snap ring such as the snap ring 80 is set to a set portion (for example, the groove portion 81*a*) of a shaft (for example, the fixing roller shaft 81) of a rotator (for example, the fixing roller 26A) from a direction orthogonal to an axial direction of the shaft (for example, the radial direction of the fixing roller shaft 81). The snap ring includes a snap ring body. The snap ring body includes a first arcuate portion such as the first arcuate portion 80*a*1 and a second arcuate portion such as the second arcuate portion 80*a*2. The first arcuate portion and the second arcuate portion face each other, are elastically deformable in a direction away from each other, are configured to hold the set portion by an elastic deformation restoring force, and have one end of the first arcuate portion and one end of the second arcuate portion that are away from each other to form an insertion portion such as the opening 80*b* to insert the set portion. In addition, the manufacturing method according to the fifteenth aspect includes a process processing the wire to form guides such as the guides 80*c*. The guides are a first guide and a second guide. The first guide extends from the one end of the first arcuate portion forming the insertion portion in a radially outward direction of the first arcuate portion and a direction inclined with respect to an insertion direction in which the set portion is inserted into the snap. The second guide extends from the one end of the second arcuate portion in a radially outward direction of the second arcuate portion and a direction inclined with respect to the insertion direction in which the set portion is inserted into the snap ring.

According to the fifteenth aspect, the snap ring that the operator can easily set to the set portion of the shaft can be easily made.

Sixteenth Aspect

In a sixteenth aspect, a manufacturing method includes a process processing a wire to make a snap ring described below. That is, the snap ring such as the snap ring 80 is set to a set portion (for example, the groove portion 81*a*) of a shaft (for example, the fixing roller shaft 81) of a rotator (for example, the fixing roller 26A) from a direction orthogonal to an axial direction of the shaft (for example, the radial direction of the fixing roller shaft 81). The snap ring includes a snap ring body. The snap ring body includes a first arcuate portion such as the first arcuate portion 80*a*1 and a second arcuate portion such as the second arcuate portion 80*a*2. The first arcuate portion and the second arcuate portion face each other, are elastically deformable in a direction away from each other, are configured to hold the set portion by an elastic deformation restoring force, and have one end of the first arcuate portion and one end of the second arcuate portion that are away from each other to form an insertion portion such as the opening 80*b* to insert the set portion. In addition, the manufacturing method according to the sixteenth aspect includes a process processing the wire forming a handling portion such as the projection 80*d*. The handling portion is disposed between another end of the first arcuate portion and another end of the second arcuate portion. The handling portion extends in a direction inclined with respect to an imaginary plane including the first arcuate portion and the second arcuate portion.

According to the sixteenth aspect, the snap ring that is easily handled by the operator can be easily made. That is, the operator uses fingers or the general tool such as the needle-nose pilers and easily holds the handling portion to push or pull the handling portion when the operator sets or removes the snap ring to or from the shaft.

The above-described embodiments are illustrative and do not limit the present disclosure. Thus, numerous additional modifications and variations are possible in light of the above teachings. It is therefore to be understood that within the scope of the present disclosure, the present disclosure may be practiced otherwise than as specifically described herein. Further, features of components of the embodiments, such as the number, the position, and the shape are not limited the embodiments and thus may be preferably set.

What is claimed is:

1. A snap ring configured to be set to a set portion of a shaft of a rotator from a direction orthogonal to an axial direction of the shaft, the snap ring comprising;
a snap ring body,
the snap ring body that includes a first arcuate portion and a second arcuate portion, the first arcuate portion and the second arcuate portion facing each other, being elastically deformable in directions away from each other, and being configured to hold the set portion by elastic deformation restoring force,
the snap ring body having one end of the first arcuate portion and one end of the second arcuate portion that are away from each other to form an insertion portion to insert the set portion,
the first arcuate portion having, when the snap ring is not used, a same radius of curvature as the second arcuate portion, a same radius of curvature as the set portion, and a center of curvature closer to the second arcuate portion than the first arcuate portion, and
the second arcuate portion having a center of curvature closer to the first arcuate portion than the second arcuate portion when the snap ring is not used.

2. The snap ring according to claim 1, further comprising:
a first guide extending from the one end of the first arcuate portion forming the insertion portion, in a radially outward direction of the first arcuate portion and a direction inclined with respect to an insertion direction in which the set portion is inserted into the snap ring; and
a second guide extending from the one end of the second arcuate portion forming the insertion portion, in a radially outward direction of the second arcuate portion and a direction inclined with respect to the insertion direction in which the set portion is inserted into the snap ring.

3. The snap ring according to claim 2,
wherein each of the first guide and the second guide includes a part having a curved shape configured to contact the shaft when the snap ring is set to the set portion.

4. The snap ring according to claim 1, further comprising:
a handling portion between another end of the first arcuate portion and another end of the second arcuate portion,
wherein the handling portion extends in a direction inclined with respect to an imaginary plane including the first arcuate portion and the second arcuate portion.

5. The snap ring according to claim 1,
wherein the snap ring body is a metal wire having a uniform cross-sectional shape in a longitudinal direction of the metal wire.

6. A rotator device comprising:
a rotator having a shaft with a set portion; and
the snap ring according to claim 1 set to the set portion.

7. The rotator device according to claim 6,
wherein the set portion is a groove portion on the shaft.

8. The rotator device according to claim 7, further comprising
a contacted member movable relative to the shaft in an axial direction of the shaft,
wherein the snap ring body is made of a wire having a cross-sectional circle, and
wherein the groove portion has two walls including a first wall near the contacted member and a second wall farther from the contacted member than the first wall, and a height of the second wall is equal to or larger than a radius of the cross-sectional circle of the snap ring body.

9. A rotator device comprising:
a rotator having a shaft;
a rolling bearing movable relative to the shaft in an axial direction of the shaft; and
the snap ring according to claim 4.

10. A fixing device comprising:
two rotators configured to form a fixing nip at which an image is fixed on a recording medium; and
the snap ring according to claim 1 set to at least one of the two rotators.

11. An image forming apparatus comprising the rotator device according to claim 6.

12. A snap ring configured to be set to a set portion of a shaft of a rotator from a direction orthogonal to an axial direction of the shaft, the snap ring comprising:
a snap ring body that includes a first arcuate portion and a second arcuate portion, the first arcuate portion and the second arcuate portion facing each other, being elastically deformable in directions away from each other, and being configured to hold the set portion by elastic deformation restoring force, the snap ring body having one end of the first arcuate portion and one end of the second arcuate portion that are away from each other to form an insertion portion to insert the set portion,
the first arcuate portion having a center of curvature closer to the second arcuate portion than the first arcuate portion when the snap ring is not used, and
the second arcuate portion having a center of curvature closer to the first arcuate portion than the second arcuate portion when the snap ring is not used;
a first guide extending from the one end of the first arcuate portion forming the insertion portion, in a radially outward direction of the first arcuate portion and a direction inclined with respect to an insertion direction in which the set portion is inserted into the snap ring; and
a second guide extending from the one end of the second arcuate portion forming the insertion portion, in a radially outward direction of the second arcuate portion and a direction inclined with respect to the insertion direction in which the set portion is inserted into the snap ring.

13. The snap ring according to claim 12,
wherein each of the first guide and the second guide includes a part having a curved shape configured to contact the shaft when the snap ring is set to the set portion.

14. The snap ring according to claim 12, further comprising:
a handling portion between another end of the first arcuate portion and another end of the second arcuate portion,
wherein the handling portion extends in a direction inclined with respect to an imaginary plane including the first arcuate portion and the second arcuate portion.

15. The snap ring according to claim 12,
wherein the snap ring body is a metal wire having a uniform cross-sectional shape in a longitudinal direction of the metal wire.

16. A rotator device comprising:
a rotator having a shaft with a set portion; and
the snap ring according to claim 12 set to the set portion.

17. An image forming apparatus comprising
the rotator device according to claim 16.

18. A snap ring configured to be set to a set portion of a shaft of a rotator from a direction orthogonal to an axial direction of the shaft, the snap ring comprising:
a snap ring body that includes a first arcuate portion and a second arcuate portion, the first arcuate portion and a second arcuate portion facing each other, being elastically deformable in directions away from each other, and being configured to hold the set portion by elastic deformation restoring force, the snap ring body having one end of the first arcuate portion and one end of the second arcuate portion that are away from each other to form an insertion portion to insert the set portion,
the first arcuate portion having a center of curvature closer to the second arcuate portion than the first arcuate portion when the snap ring is not used, and
the second arcuate portion having a center of curvature closer to the first arcuate portion than the second arcuate portion when the snap ring is not used; and
a handling portion between another end of the first arcuate portion and another end of the second arcuate portion, the handling portion extending in a direction inclined with respect to an imaginary plane including the first arcuate portion and the second arcuate portion.

19. The snap ring according to claim 18,
wherein the snap ring body is a metal wire having a uniform cross-sectional shape in a longitudinal direction of the metal wire.

20. A rotator device comprising:
a rotator having a shaft with a set portion; and
the snap ring according to claim 17 set to the set portion.

* * * * *